(12) United States Patent
Tiesler et al.

(10) Patent No.: US 7,954,615 B2
(45) Date of Patent: Jun. 7, 2011

(54) DEVICE FOR ACTUATING A MULTIPLATE CLUTCH IN A TRANSMISSION

(75) Inventors: Peter Tiesler, Meckenbeuren (DE); Christoph Margraf, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 501 days.

(21) Appl. No.: 12/225,788

(22) PCT Filed: Mar. 23, 2007

(86) PCT No.: PCT/EP2007/052815
§ 371 (c)(1),
(2), (4) Date: Sep. 29, 2008

(87) PCT Pub. No.: WO2007/113143
PCT Pub. Date: Oct. 11, 2007

(65) Prior Publication Data
US 2009/0229942 A1 Sep. 17, 2009

(30) Foreign Application Priority Data
Mar. 30, 2006 (DE) .......................... 10 2006 014 737

(51) Int. Cl.
F16D 25/10 (2006.01)
F16D 25/0638 (2006.01)

(52) U.S. Cl. ............. 192/48.619; 192/85.25; 192/85.41; 192/85.61; 192/106 F; 192/113.34

(58) Field of Classification Search ............. 192/48.619, 192/85.25, 106 F
See application file for complete search history.

(56) References Cited

U.S. PATENT DOCUMENTS

| 3,217,851 | A | * | 11/1965 | Mogk et al. | ................ 192/85.24 |
| 5,411,123 | A | | 5/1995 | Rej et al. | |
| 6,021,879 | A | | 2/2000 | Pelouch | |
| 6,305,521 | B1 | * | 10/2001 | Hall et al. | .................. 192/85.41 |
| 7,001,298 | B2 | | 2/2006 | Biermann et al. | |
| 2003/0232675 | A1 | | 12/2003 | Miyazaki et al. | |
| 2006/0289269 | A1 | | 12/2006 | Tiesler | |

FOREIGN PATENT DOCUMENTS

| DE | 102 48 172 A1 | 4/2004 |
| DE | 103 33 431 A1 | 2/2005 |
| DE | 103 42 897 A1 | 4/2005 |
| DE | 103 50 573 A1 | 6/2005 |

(Continued)

*Primary Examiner* — Richard M. Lorence
(74) *Attorney, Agent, or Firm* — Davis & Bujold, P.L.L.C.

(57) ABSTRACT

A device for actuating a disk clutch (B) in a transmission, which consists of an actuating piston-cylinder arrangement with rotation pressure compensation, whose actuating piston (6) is associated with a pressure chamber (4) for a pressure medium fluid to produce the actuating force, and in which a pressure compensation chamber (26) is provided, in which by virtue of centrifugal action a pressure medium fluid produces on the actuating piston a compensation force directed in opposition to the actuation direction of the actuating piston, the pressure chamber and the pressure compensation chamber each having a delivery line (9, 21) for pressure medium fluid. To simplify the structure of this device and reduce costs, the pressure compensation chamber is arranged completely a radial distance away from the pressure chamber, the pressure compensation chamber is delimited by a disk carrier (1) of the disk clutch that carries inner disks and by the actuating piston and the pressure compensation chamber is arranged radially above a flow channel (25) leading through the disk carrier that carries inner disks (13).

10 Claims, 1 Drawing Sheet

FOREIGN PATENT DOCUMENTS

| | | |
|---|---|---|
| DE | 10 2004 027 088 A1 | 1/2006 |
| EP | 1 382 875 A1 | 7/2002 |
| EP | 1 489 328 A1 | 12/2004 |
| EP | 1 602 846 A1 | 12/2005 |
| FR | 2 868 137 A1 | 9/2005 |
| JP | 2000297827 A * | 10/2000 |

* cited by examiner

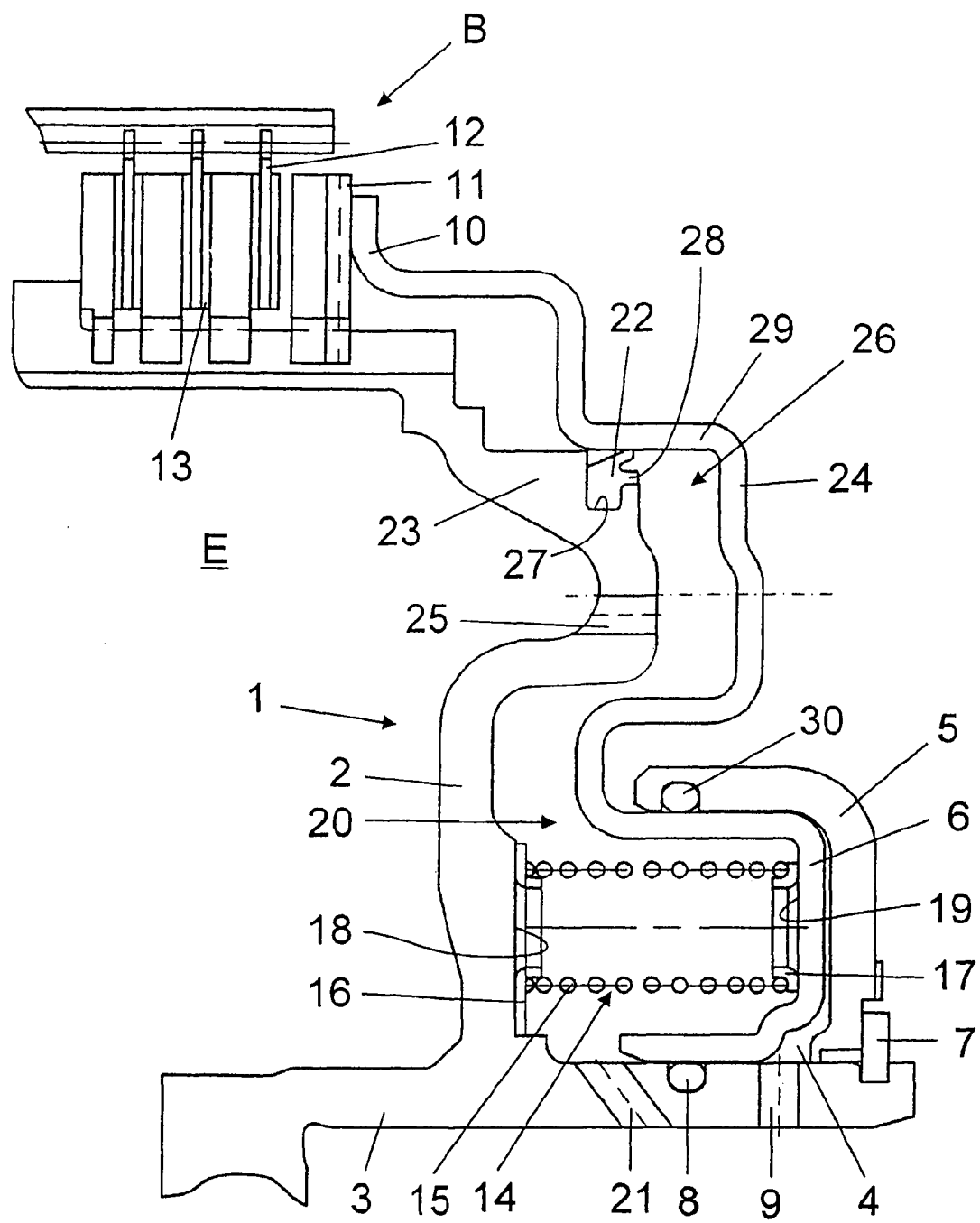

DEVICE FOR ACTUATING A MULTIPLATE CLUTCH IN A TRANSMISSION

This application is a national stage completion of PCT/EP2007/052815 filed Mar. 23, 2007, which claims priority from German Application Serial No. 10 2006 014 737.5 filed Mar. 30, 2006.

FIELD OF THE INVENTION

The invention concerns a device for actuating a disk clutch in transmission.

BACKGROUND OF THE INVENTION

From DE 102 48 172 A1 an automatic transmission with a disk clutch is known, which comprises a servomechanism in the form of an actuating piston-cylinder arrangement with dynamic pressure compensation, arranged radially inside a disk carrier, for actuating the clutch. In addition, this automatic transmission comprises a planetary gearset with a planetary gear carrier. The servomechanism of this transmission comprises an actuating piston which, together with a correspondingly configured wall of a disk carrier of the clutch, forms a pressure chamber. When the pressure chamber is pressurized via a pressure medium delivery bore, then when the restoring force of a restoring spring has been overcome the actuating piston, is moved axially against the clutch disks.

On the side of the actuating piston, opposite the pressure chamber is arranged a pressure compensation chamber to receive a fluid by way of which the dynamic fluid pressure on the actuating piston, caused by the rotation of the clutch, is at least approximately compensated. For this, the pressure compensation chamber is filled with a lubricant admitted through a lubricant bore located in a hub of the disk carrier. In this known transmission, the pressure compensation chamber, arranged radially under the clutch disks and axially next to the actuating piston and the pressure chamber, is formed by a profiled spacer plate as an axially fixed, diaphragm plate and by a pot-shaped section of the axially displaceable actuating piston.

The supply of the lubricant to the planetary gears and the supply of the pressure compensation chamber also take place through a common inlet arranged in the area of the inside diameter of the profiled spacer plate and fed via the already mentioned inlet bore. At the radially inner lubricant inlet to the pressure compensation chamber, the lubricant flow is divided into two part-streams, one of which passes into the pressure compensation chamber while a second part-stream passes into a lubricant chamber close to the planetary gears.

From DE 103 33 431 A1 and DE 103 50 573 A1, a clutch arrangement in an automated shift transmission, is known in each case, with two axially and radially adjacent disk clutches B and E, where the inner disks of the radially inner clutch E are arranged on an inner disk carrier and the outer disks of the radially outer clutch B are arranged on an outer disk carrier. The inner disks of the radially outer clutch B and the outer disks of the radially inner clutch E are positioned on a common disk carrier with respective inner disks and outer disks of the two clutches B and E arranged axially in alternation.

Associated with each of the two disk sets is an actuating piston-cylinder arrangement, whose actuating piston is, in each case, associated with a respective pressure chamber for a fluid pressure medium to produce an actuating force, a pressure compensation chamber being provided in each case. These actuating piston-cylinder arrangements, referred to as servo-mechanisms, are arranged in such a manner that the two clutches B and E can be actuated in the same axial direction to close them.

The pressure compensation chamber of the radially outer clutch B in this arrangement has its filling zone partially at the same radial height as and an axial distance away from the pressure chamber of the associated actuating piston. In addition, this pressure compensation chamber is axially delimited in its filling zone by the inner wall of the actuating piston and by a diaphragm plate with a sealing element.

In this pressure compensation chamber, a restoring element is arranged, made as a compression spring packet and orientated axially parallel to the actuation direction, which is prestressed between the middle section of the common disk carrier and the actuating piston. Between the end of this compression spring packet on the disk carrier side and the disk carrier section is clamped a disk-shaped section of the diaphragm plate so that the diaphragm plate is pressed axially against the disk carrier.

To delimit the pressure compensation chamber axially and radially, the diaphragm plate, according to DE 103 33 431 A1, is configured and fitted in such a manner that between it and the radial disk carrier section, a flow channel is left free, which comprises an inlet opening for the coolant or lubricant loading into the pressure compensation chamber and an outlet opening in a horizontal section of the common disk carrier. The position of the inlet opening in the flow channel is chosen in the radial direction on the diaphragm plate so that it matches a predetermined overflow height into the pressure compensation chamber. This overflow height radially covers a section of the pressure space for the associated actuating piston.

Finally, from DE 103 42 897 A1, a device for actuating a clutch in a transmission is known, which consists of an actuating piston-cylinder arrangement with rotation pressure compensation, with whose actuating piston is associated a pressure chamber for a fluid pressure medium to produce the actuating force, and in which a pressure compensation chamber is provided, in which pressure medium fluid produces by virtue of centrifugal action, a compensation force on the actuating piston, whose direction is opposite to the active actuation direction of the actuating piston. The pressure compensation chamber is arranged radially outside the pressure chamber. In this device, it is additionally provided that the pressure compensation chamber is supplied with pressure medium via the pressure chamber. This. avoids separate supply lines for the pressure chamber and the pressure compensation chamber. The supply line, pressure chamber and the pressure compensation chamber are positioned as if radially in series and have no axial separation from one another. A further feature of this actuating piston-cylinder arrangement is that the pressure actuation chamber is delimited by a horizontal section of the outer disk carrier and by the actuating piston.

This known device, for correspondingly configured transmission structures, is certainly an improvement in that it saves a supply line. However it cannot, or only sometimes, be used in transmission structures such as those known from DE 103 50 573 A1 and DE 103 33 431 A1. The solutions described therein have proved their worth in practice, but still leave room for improvement. In particular, those clutch arrangements require the incorporation of a diaphragm plate or sheet. This diaphragm sheet, which delimits the pressure compensation chamber in the radial and axial direction, is a separate component which takes up structural space and has to be produced separately. To an increasing extent, however, as the design of the transmissions gets ever more compact and, at the same time more complex, it is precisely structural space that becomes very restricted. Moreover, a separate component adds to the production and assembly costs.

Against this background the purpose of the present invention is to provide a device of the type described, which consists of as few components as possible and takes up comparatively little structural space.

SUMMARY OF THE INVENTION

The invention is based on recognition that the declared objective can be achieved in a surprisingly simple manner if the pressure compensation chamber is arranged completely a radial distance away from the pressure chamber of an actuating piston-cylinder arrangement, and is delimited only by the disk carrier that carries the outer disks and the actuating piston. In this way, costs can be saved by omitting a separate diaphragm plate.

Accordingly, the invention starts with a device for actuating a disk clutch in a transmission, which consists of an actuating piston-cylinder arrangement with rotation pressure compensation, whose actuating piston is associated with a pressure chamber for a pressure medium fluid to produce the actuating force, and in which a pressure compensation chamber is provided in which, by virtue of centrifugal force, a pressure medium fluid produces a compensation force on the actuating piston, whose direction is opposite to the actuation direction of the actuating piston, the pressure chamber and the pressure compensation chamber, each having a supply line for the pressure medium fluid.

In addition, in this clutch actuation device, it is provided that the pressure compensation chamber is arranged completely a radial distance away from the pressure chamber, the pressure compensation chamber is delimited by a disk carrier of the disk clutch that carries inner disks and by the actuating piston, and the pressure compensation chamber is arranged radially above a flow channel that leads axially through the disk carrier carrying the inner disks.

The flow channel serves to remove excess pressure medium fluid from the pressure compensation chamber and for the cooling and lubrication of the disk clutch. Due to the arrangement of the flow channel, the maximum filling volume of the pressure compensation chamber can be determined in a controlled manner.

Thanks to this configuration of the clutch actuation device, production and assembly costs can be saved by not having to incorporate a separate diaphragm plate as in the documents of the prior art that define devices of this generic type.

Furthermore, it can be provided that the pressure compensation chamber is arranged axially spaced, relative to the pressure chamber and to the disk clutch. Preferably, the pressure compensation chamber is positioned largely axially midway between the pressure chamber and the disk clutch.

As a further design feature of the invention, it can be provided that a sealing element, that acts against an axial section of the actuating piston, is fixed on a radially middle section of the disk carrier carrying the inner disks. This sealing element serves to seal off those radial areas of the disk carrier and actuating piston which now form the pressure compensation chambers.

In this connection, it can be provided that a groove is formed in the middle section of the disk carrier to hold the sealing element. The sealing element can be a lip seal or an O-ring seal. To achieve very particularly reliable sealing, the sealing element can be acted upon by the pressure of a spring element or it may incorporate a spring element vulcanized into it.

A practical further development of the invention provides that a restoring element in the form of a compression spring is arranged between the radially inner section of the disk carrier and the actuating piston and supported in each case against separate pressure pads. These pressure pads are arranged on an axially inner wall of the radially inner section of the disk carrier and on an axially inner wall of the actuating piston.

Alternatively to this, however, it is also possible and within the scope of the invention that at least one pressure pad is formed integrally in the inner wall of the disk carrier and/or the actuating piston. This design is particularly preferred since one aim of the invention is to eliminate as many individual components as possible in order to save structural space and costs. The integral incorporation of pressure pads in the disk carrier and/or the actuating piston serves that aim.

As a further design feature of the invention, it is provided that the transmission is made as an automatic transmission with at least two axially adjacent disk clutches, with each of which an actuating piston-cylinder arrangement for axial clutch actuation is associated, in each case comprising a pressure chamber for the axial actuation, in each case a pressure compensation chamber for dynamic clutch actuation pressure compensation, and in each case means for the supply of lubricant and coolant medium. In this case, the disk sets of the two clutches are arranged radially one above the other whereas the actuating piston-cylinder arrangements of the two clutches for actuating the respectively associated disk sets are positioned at least largely axially next to one another. In addition, in this case it is provided that the pressure compensation chamber for the radially outer clutch is arranged axially next to and radially above the pressure chamber for actuating an actuating piston of the radially inner clutch.

BRIEF DESCRIPTION OF THE DRAWING

The invention will now be described, by way of example, with reference to the accompanying drawing in which:

The sole FIGURE shows a cross-section through an automatic transmission in the area of a disk clutch B.

DETAILED DESCRIPTION OF THE INVENTION

The sole FIGURE shows a cross-section through an automatic transmission in the area of a disk clutch B, which is arranged together with a second disk clutch E (not shown in greater detail) radially and also axially directly adjacent to one another in a transmission housing (not shown). The radially outer disk clutch B comprises a disk carrier 1 carrying inner disks 13, which is connected radially on the inside with a radially outward-extending lower section 2 that has a rotating hub 3. The device for actuating the clutch B is formed as an actuating piston-cylinder arrangement integrated in the transmission. In it, a pressure chamber 4 is delimited by an actuation cylinder 5, the hub 3 and an actuating piston 6. On the inside diameter of its radially directed section, the actuation cylinder 5 is fitted over the hub 3 and secured against axial displacement by way of a locking ring 7. In this configuration, the radially outward-facing side of the hub 3 forms the second axial portion of the actuation cylinder 5. In the area of the hub 3, the actuating piston 6 is made pot-shaped and is sealed radially inside and radially outside, relative to the actuation cylinder 5 and the hub 3, by respective sealing elements 8, 30 made as ring seals.

Through a delivery line 9 pressure medium fluid can be fed into the pressure chamber 4. This inflow of pressure medium fluid causes the actuating piston 6 to move axially, whereby a pressure element 10 of the actuating piston 6, formed radially outside, it is pressed against a contact pressure ring 11 of the disk clutch B. This brings about an axial displacement of moveable outer disks 12 and inner disks 13 against an axial abutment on the inner disk carrier 1 so that the disk clutch B is closed. If the pressure in the pressure chamber 4 is reduced, the actuating piston 6 moves back to its starting position. This return is brought about by a restoring element 14 in the form of a compression spring packet 15 which acts upon the actuating piston 6.

The restoring element 14 is fitted with pre-stress, between the radially inner section 2 of the inner disk carrier 1 and the actuating piston 6, and is supported against respective pressure pads 16 and 17. The pressure pad 16 is arranged on an axially inner wall 18 of the radially inner section 2 of the inner disk carrier 1 and the pressure pad 17 on an axially inner wall 19 of the actuating piston 6.

Into a space 20 delimited by the inner wall 18 of the inner disk carrier 1, the inner wall 19 of the actuating piston 6 and the hub 3, a pressure medium fluid can flow through a delivery line 21 as far as a sealing element 22 by which a central, axis-parallel section 23 of the inner disk carrier 1 is sealed relative to a central, axis-parallel section 24 of the actuating piston 6. Radially under the sealing element 22, a flow channel 25 is formed in the central section 23 of the inner disk carrier 1, through which excess pressure medium fluid can flow in a known manner for cooling the clutch B from a pressure compensation chamber 26 formed there.

The radial arrangement of the flow channel 25 in the inner disk carrier 1 determines the maximum filling level of the pressure compensation chamber 26 during operation and therefore also the resulting, speed-dependent compensating force on the actuating piston 6. Thus, a pressure medium volume collects in the pressure compensation chamber 26, which is designed such that the rotating pressure medium force produced in the pressure compensation chamber 26 at a particular rotation speed corresponds to the rotation-related, dynamic pressure medium force on the actuating piston 6 in the pressure chamber 4 so that the resultant dynamic force on the actuating piston 6 is preferably at least approximately equal to zero. In this way, the clutch B can be actuated in a dynamically compensated manner.

To hold the sealing element 22, a groove 27 is formed in the central section 23 of the inner disk carrier 1, into which the sealing element 22 is inserted. In this case, the sealing element 22 chosen is a lip seal 28, which acts as a sliding seal against the actuating piston 6.

To counteract a rotation-force-related expansion of the actuating piston 6 under load and to maintain the sealing effect, the sealing element 22 can be sprung. For this, a spring element can be present in the groove 27 or incorporated in the sealing element 22, this spring pressing the sealing element 22 radially against an axial section 29 of the actuating piston 6.

Instead of the separate pressure pads 16 and 17, illustrated in the drawing, these can also be integrally formed in the inner walls 18 and 19 of the inner disk carrier 1 and the actuating piston 6 respectively, for example as precision-forged or machined recesses.

Instead of the compression spring set 15, illustrated in the drawing, a cup spring can be provided as the restoring element 14.

As the single drawing also shows, in an axial-space-saving manner, the pressure compensation chamber 26 is arranged axially substantially centrally and radially above the restoring element 14.

The second disk clutch, whose presence is indicated only by the reference symbol E, can be one such as those known from the documents DE 103 50 573 A1 and DE 103 33 431 A1. The disk clutch E would then correspond to a radially inner clutch E as known from the documents. The difference from those solutions is that the pressure compensation chamber 26 for the radially outer disk clutch B is arranged axially next to and radially above the pressure chamber for the actuation of an actuating piston of the radially inner disk clutch E.

Finally, it should be mentioned that the disk carrier 1 carrying the inner disks 13 can also be used as a carrier for the outer disks of the radially inner disk clutch E.

REFERENCE NUMERALS

1 inner disk carrier, disk carrier
2 radially inner section of the inner disk carrier 1
3 hub
4 pressure chamber
5 actuation cylinder
6 actuating piston
7 locking ring
8 sealing element
9 supply line
10 pressure element
11 contact pressure ring
12 outer disks
13 inner disks
14 restoring element
15 compression spring packet
16 pressure pad
17 pressure pad
18 inner wall of the inner disk carrier 1
19 inner wall of the actuating piston 6
20 space
21 delivery line
22 sealing element
23 central section of the inner disk carrier 1
24 central section of the actuating piston 6
25 flow channel
26 pressure compensation chamber
27 groove
28 lip seal
29 axial section of the actuating piston 6
30 sealing element
B radially outer disk clutch
E radially inner disk clutch

The invention claimed is:

1. A device for actuating a disk clutch (B) in a transmission, the device comprising:
   a piston-cylinder arrangement having an actuating piston (6) that is actuated in a first axial direction as a pressure medium liquid passes through a first supply line (9) and enters a pressure chamber (4), which is associated with the actuating piston;
   a pressure compensation chamber (26) having a second supply line (21) through which centrifugal force pressure medium fluid flows and enters the pressure compensation chamber (26) for producing a compensating force, which is applied on the actuating piston (6) to push the actuating piston (6) in a second axial direction opposite the first axial direction; and
   the pressure compensation chamber (26) being radially located completely over the pressure chamber (4) and being separated therefrom a radial distance, the pressure compensation chamber (26) being delimited by the actuating piston (6) and a disk carrier (1), which supports inner disks (13) of the disk clutch (B), the pressure compensation chamber (26) being radially located above a flow channel (25) that axially extends through the disk carrier (1) and delimits a radial interior of the pressure compensation chamber (26).

2. The device according to claim 1, wherein the pressure compensation chamber (26) is axially spaced between the pressure chamber (4) and the disk clutch (B).

3. The device according to claim 1, wherein a lubricant for cooling the disks (12, 13) of the disk clutch, (B) flows from a space (20), which is delimited by an inner wall (18) of the disk carrier (1), an inner wall (19) of the actuating piston (6) and a hub (3) of the disk carrier (1), through the flow channel (25) of the disk carrier (1) to the disks (12, 13) of the disk clutch (B).

4. The device according to claim 1, wherein a sealing element (22) contacts an axial section (29) of the actuating piston (6) and is fixed on a radially central section (23) of the disk carrier (1).

5. The device according to claim 4, wherein the central section (23) of the disk carrier (1) has a groove (27) into which the sealing element (22) is accommodated.

6. The device according to claim 4, wherein the sealing element (22) is one of a lip seal (28) and an O-ring seal.

7. The device according to claim 4, wherein a spring element applies pressure on the sealing element (22).

8. The device according to claim 1, wherein a restoring element (14) is arranged between a first pressure pad (16) arranged on an axially inner wall (18) of the lower section (2) of the disk carrier (1) and a second pressure pad (17) on an axially inner wall (19) of the actuating piston (6).

9. The device according to claim 8, wherein at least one of the first pressure pad (16) is integral with the axially inner wall (18) of the disk carrier (1) and
the second pressure pad (17) is integral with the axially inner wall (19) of the actuating piston (6).

10. The device according to claim 1, wherein the transmission is an automatic transmission having at least two adjacent disk clutches (B, E), each of which have
an actuating piston-cylinder arrangement for axially actuating a respective one of the at least two disk clutches (B, E);
a pressure chamber for axially actuating the respective disk clutch (B, E);
a pressure compensation chamber for dynamic clutch actuation pressure compensation; and
a means for supplying one of a lubricant and a coolant medium;
the at least two clutches (B, E) are radially arranged one above the other, the actuating piston-cylinder arrangements for axially actuating the at least two clutches (B, E) are axially arranged at least substantially adjacent, and a pressure compensation chamber (26) for the radially outer clutch (B) is axially adjacent and radially above a pressure chamber for actuating an actuating piston of a radially inner clutch (E).

* * * * *